United States Patent
Wu et al.

(10) Patent No.: US 9,041,867 B2
(45) Date of Patent: May 26, 2015

(54) DISPLAY CASING AND COVER STRUCTURE THEREOF

(75) Inventors: Chuang-Ming Wu, New Taipei (TW); Ta-Wei Li, New Taipei (TW)

(73) Assignee: AmTRAN TECHNOLOGY CO., LTD., New Taipei (TW)

( * ) Notice: Subject to any disclaimer, the term of this patent is extended or adjusted under 35 U.S.C. 154(b) by 391 days.

(21) Appl. No.: 13/228,074

(22) Filed: Sep. 8, 2011

(65) Prior Publication Data

US 2012/0217860 A1    Aug. 30, 2012

(30) Foreign Application Priority Data

Feb. 25, 2011    (TW) ............................. 100106516 A (51) Int. Cl.
  *H04N 5/64*    (2006.01)
  *H05K 5/02*    (2006.01)
  *G06F 1/16*    (2006.01)
  *H04M 1/02*    (2006.01)

(52) U.S. Cl.
  CPC ................ *H05K 5/02* (2013.01); *G06F 1/1601* (2013.01); *G06F 1/1637* (2013.01); *G06F 2200/1612* (2013.01); *H04M 1/0252* (2013.01)

(58) Field of Classification Search
  None
  See application file for complete search history.

(56) References Cited

U.S. PATENT DOCUMENTS

| | | | | |
|---|---|---|---|---|
| 6,958,786 | B2 * | 10/2005 | Kim et al. ...................... | 348/836 |
| 8,169,553 | B2 * | 5/2012 | Yamanaka ..................... | 348/836 |
| 2010/0033641 | A1 * | 2/2010 | Ogasawara et al. ........... | 348/836 |
| 2010/0146766 | A1 * | 6/2010 | Dabov et al. .................... | 29/428 |
| 2010/0165219 | A1 * | 7/2010 | Ikunami ......................... | 348/836 |
| 2011/0188179 | A1 * | 8/2011 | Myers et al. ............. | 361/679.01 |
| 2011/0188180 | A1 * | 8/2011 | Pakula et al. ............ | 361/679.01 |
| 2011/0222212 | A1 * | 9/2011 | Xiao et al. ............... | 361/679.01 |
| 2011/0249387 | A1 * | 10/2011 | U et al. .................... | 361/679.21 |
| 2011/0255218 | A1 * | 10/2011 | Pakula et al. ............ | 361/679.01 |

FOREIGN PATENT DOCUMENTS

| | | |
|---|---|---|
| TW | I259056 | 7/2006 |
| TW | M352869 | 3/2009 |
| TW | M379097 | 4/2010 |

* cited by examiner

*Primary Examiner* — Gims Philippe
*Assistant Examiner* — Samuel D Fereja
(74) *Attorney, Agent, or Firm* — Muncy, Geissler, Olds & Lowe, P.C.

(57) ABSTRACT

A display casing has a first cover, a second cover, and a fixing member between the first cover and the second cover to serve as a combination medium therebetween. The fixing member is engaged with two buckling pieces of the first cover by a positioning pin and a restraining portion, and the second cover is then buckled on the fixing member by a buckling member to be combined with the first cover. The material of the fixing member is the same as that of the second cover but is different from, the material of the first cover. Therefore, when the buckling member of the second cover is buckled on the fixing member, the risk of the fracture of the fixing member under the stress of the buckling member can be avoided.

16 Claims, 7 Drawing Sheets

DISPLAY CASING AND COVER STRUCTURE THEREOF

CROSS-REFERENCE TO RELATED APPLICATIONS

This non-provisional application claims priority under 35 U.S.C. §119(a) on Patent Application No(s). 100106516 filed in Taiwan, R.O.C. on Feb. 25, 2011, the entire contents of which are hereby incorporated by reference.

BACKGROUND OF THE DISCLOSURE

1. Technical Field

The present invention relates to a casing and a cover structure thereof, and more particularly to a casing of a display device and a cover structure thereof.

2. Related Art

Consumer electronic products, such as TV sets, computers, cell phones, personal digital assistants (PDA), global positioning systems (GPS) and point-of-sale terminals, always have displays which normally serve as viewing interfaces or operation interfaces for users. Generally speaking, a flat panel display device, such as an LCD display or a plasma display, is mainly composed of a casing and a display module. The casing comprises a plastic outer cover and a metal back cover. The plastic outer cover has an opening exposing the display module, so that the user could view or touch the display module.

Currently, the plastic outer cover normally has a plurality of hooks for assembling the casing. The metal back cover has a plurality of buckling pieces where the buckling pieces each have at least one opening. The hooks of the plastic outer cover are respectively corresponding to the openings of the buckling pieces. In the assembly of the casing, the hooks of the plastic outer cover each approach the corresponding openings of the buckling pieces until completely inserting into the openings and then the hooks engage with the buckling pieces of the metal back cover. As a result, the plastic outer cover is combined with the metal back cover to form the casing of the display device.

However, as the hooks of the plastic outer cover are integrated on the plastic outer cover by plastic injection molding, and the buckling pieces of the metal back cover are integrated on the metal back cover by punching a piece of metal sheet. During the combination of the plastic outer cover with the metal back cover, the assembler must apply force on the plastic outer cover to engage the plastic outer cover with the metal back cover. Therefore, in the course of the combination, the hooks of the plastic outer cover must be pushed to the buckling pieces of the metal back cover and move the buckling pieces a certain distance so as to successfully engage and insert the hooks into the openings of the budding piece. However, the material of the hooks is different from the buckling pieces. When the force is pushed downward on the plastic outer cover to engage the hooks into the openings of the buckling pieces by the assembler, a reaction force will be generated from the buckling pieces. The hooks must bear both the downward force and the reaction force, and such interaction of the downward force and reaction force may cause the fracture of the hooks due to over stress. Accordingly, such fractures of the hooks may further cause that a loose combination exists between the plastic outer cover and the metal back cover, or that the plastic outer cover cannot be engaged to the metal back cover.

SUMMARY

In view of the above-mentioned problems, the present invention is a display casing and a cover structure thereof, thereby solving the problem existing in the display casing in the prior art that hooks of a plastic outer cover are easily fractured from the plastic outer cover or damaged in the course of being buckled on buckling pieces of a metal back cover during the assembly of the plastic outer cover and the metal back cover.

An embodiment of the present invention provides a display casing, which comprises a first cover, at least one fixing member and a second cover. The first cover comprises a cover body having at least one side and at least one buckling portions. The budding portion is disposed inwardly on the side f the cover body. Each of the buckling portions has at least two budding pieces, and at least one of the two budding pieces has a connecting structure. The fixing member is correspondingly to the at least one buckling portion. Each fixing member has at least one positioning member and restraining member. The positioning member is jointed to the connecting structure, and the restraining member is jointed to the buckling pieces. The second cover has at least one buckling member and is combined to the first cover. The at least one buckling member is correspondingly buckled on the at least one fixing member. The material of the cover body is different from that of the second cover.

Another embodiment of the present invention provides a device having a structure, which comprises a cover and at least one fixing member. The cover having at least one side and at least one buckling portions. The buckling portion is disposed inwardly on the side of the cover body. Each buckling portion has at least one buckling piece, and at least one connecting structure is disposed on the at least one buckling piece. The at least one fixing member is correspondingly to the at least one buckling portion. Each of the at least one fixing member has at least one positioning member and a restraining member. The at least one positioning member is jointed to the connecting structure, and the restraining member is jointed to the budding pieces.

Another embodiment of the present invention provides a device having a frame structure, which comprises a cover body and at least one fixing member. The cover has at least one side and at least one buckling portions. The buckling portion is disposed inwardly on the side of the cover body. Each of the at least one buckling portions has at least one budding piece, and at least one connecting structure is disposed on the at least one budding piece. The at least one fixing member is corresponding to the at least one buckling portion. Each of the at least one fixing members having at least one positioning member, and a stopper member is disposed on the at least one positioning member and suspended over a surface of the fixing member. The positioning member of the at least one fixing member is jointed to the connecting structure of the at least one buckling portion, and the buckling pieces is retained by the stopper member and the surface of the fixing member.

The present invention has at least one of the following effects. The material of the fixing members is similar to or the same as that of the second cover, and the fixing members are disposed on the first cover. Therefore, when the second cover is combined with the first cover, bending deformation may be generated by the resilience of the materials of the second cover and the fixing members, thereby avoiding the fixing members fractured from the first cover due to the pushing force applied by the second cover. Moreover, the fixing members have positioning pins and/or restraining portions respectively, and the cover body of the first cover has the budding pieces and the connecting holes correspondingly, so that the fixing members can be quickly assembled on the first cover, thereby the assembly time of the first cover is reduced and the assembly efficiency of the display casing is improved.

BRIEF DESCRIPTION OF THE DRAWINGS

The present invention will become more fully understood from the detailed description given herein below for illustration only, and thus are not limitative of the present invention, and wherein.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 1:
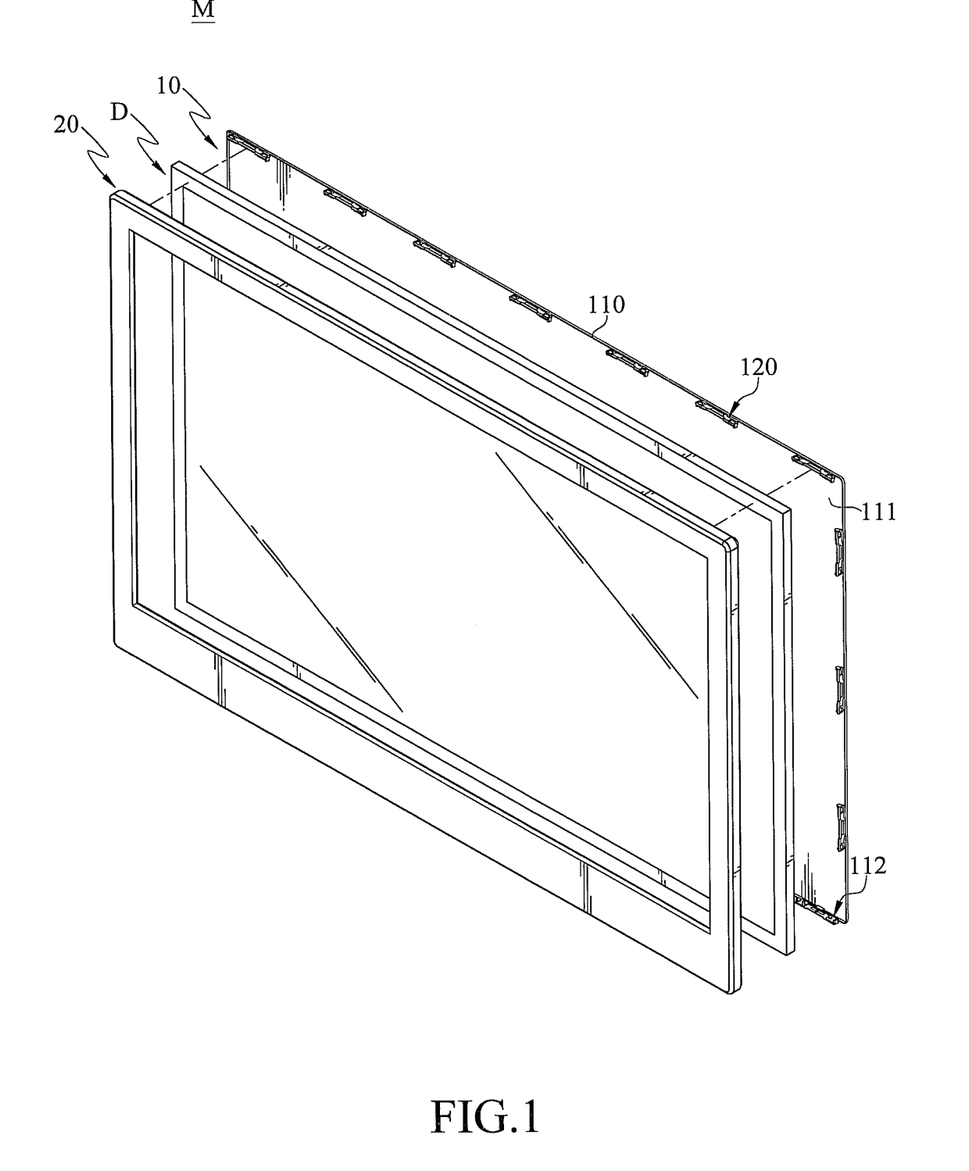
FIG. 1 is a schematic exploded view of a display module according to a first embodiment of the present invention.
Figure 2:
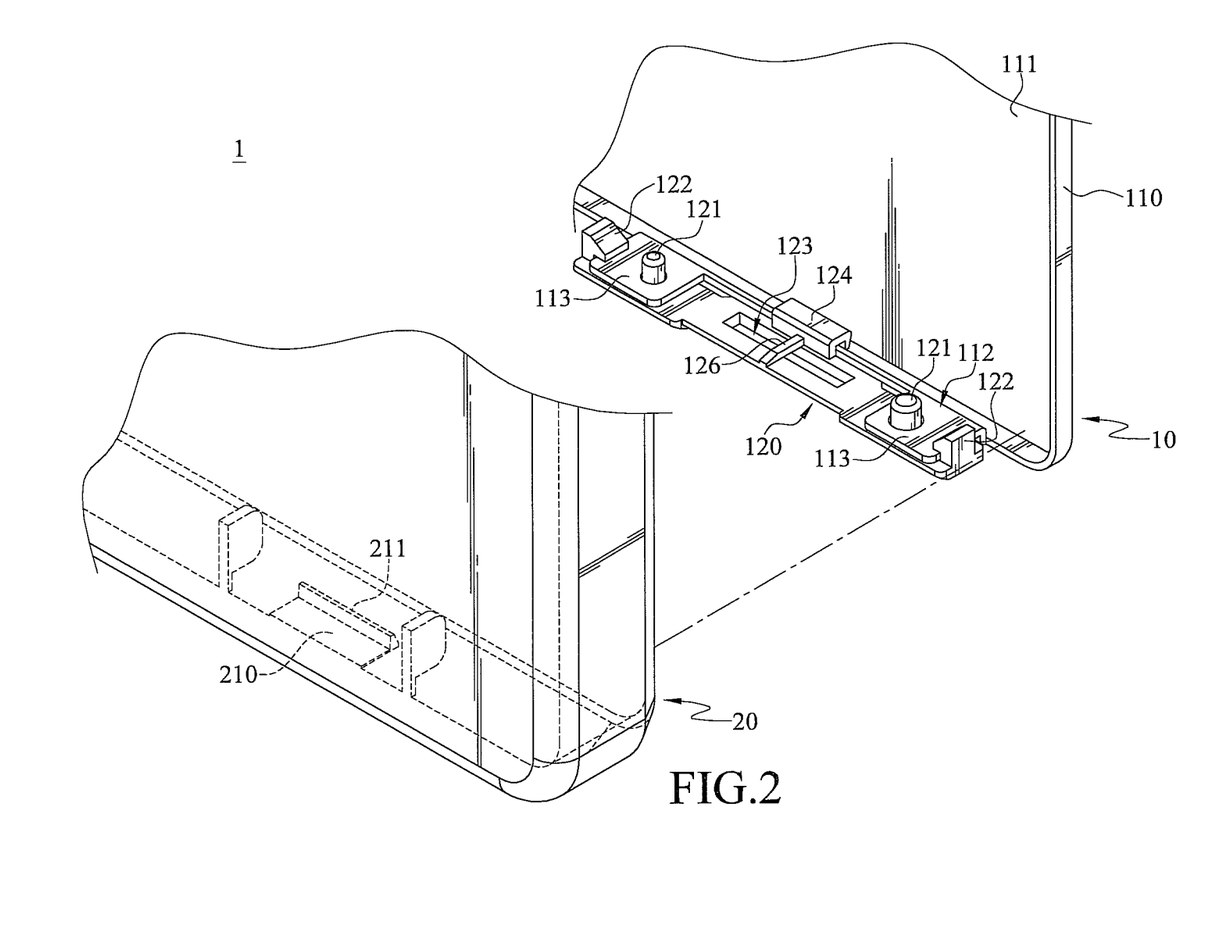
FIG. 2 is a partial enlarged schematic view of FIG. 1.
Figure 3:
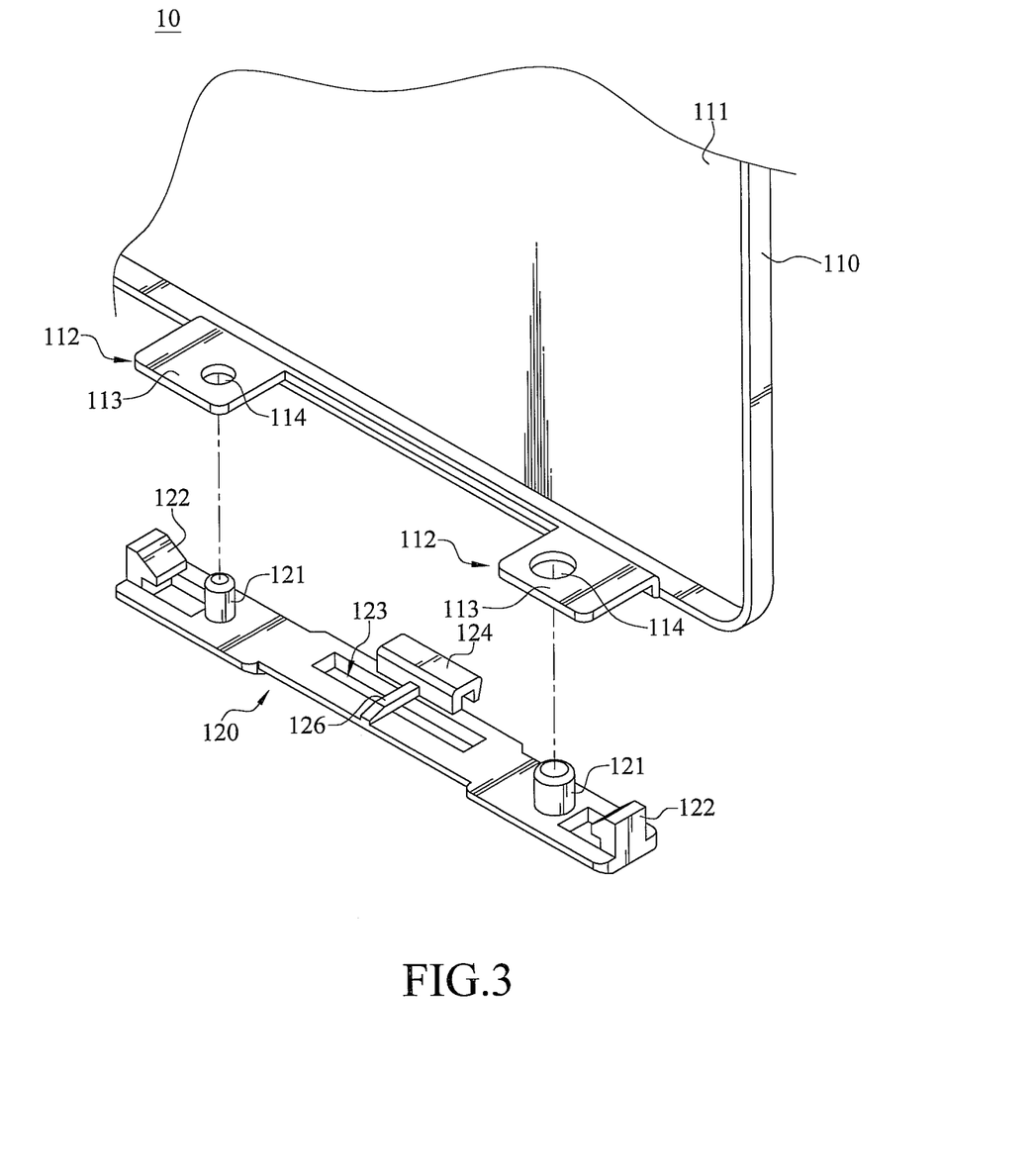
FIG. 3 is a schematic exploded view of a first cover according to the first embodiment of the present invention.

As shown in FIG. 1 to FIG. 3, a casing 1 of a display device according to an embodiment of the present invention is disclosed. The casing 1 can accommodate a display module D and constitute a display device M. The display device M can be any electronic product having a display, such as a TV set, a computer, a cell phone, a PDA, a GPS and point-of-sale terminals, where the display serves as a viewing interface or operation interface for users. In the present invention, the display module D may be, but not limited to, a LCD display module, a plasma display module or the like.

The display casing 1 comprises a first cover 10 and a second cover 20. The first cover 10 has a cover body 110 and a plurality of fixing members 120. The material of the cover body 110 is different from that of the plurality of fixing members 120. For example, when the cover body 110 is made of metal having high rigidity, the fixing members 120 may be made of flexible material such as plastic or rubber which has flexibility higher than the metal. On the contrary, if the material of the fixing members 120 and the second cover 20 is metal, the material of the cover body 110 of the first cover 10 is plastic, rubber or the like. However, in another embodiment of the present invention, the fixing members 120, the second cover 20 and the cover body 110 of the first cover 10 may be made of the same material. The materials of them may be varied in accordance with the actual situations and are not limited to the disclosure of the first embodiment of the present invention. The cover body 110 has a base plate 111 and a plurality of buckling portions 112 disposed at an interval on the lateral sides along peripheral edges of the base plate 111. The buckling portions 112 extend from the lateral sides of the base plate 111 and are suspended over the base plate 111. Two buckling pieces 113 are disposed at an interval on each other. Each buckling piece 113 has a connecting structure, and the connecting structure may be, but not limited to, a connecting hole 114 formed on the budding piece 113.

In addition, the number and the structure of the buckling pieces 113 disposed on the buckling portion 112 could be varied. It could also be only one single buckling piece 113 disposed and an concave formed on the buckling piece 113, so the single buckling piece 113 is partitioned into two small buckling pieces by the concave on the buckling portion 112. Accordingly, the single buckling piece 113 with two small buckling pieces is similar in structure and function to the two buckling pieces 113. The above mentioned two structures are only different in the way to form the buckling pieces 113 on the buckling portion 112, where the disclosure of the structures is not intended to limit the scope of the present invention.

Figure 4:
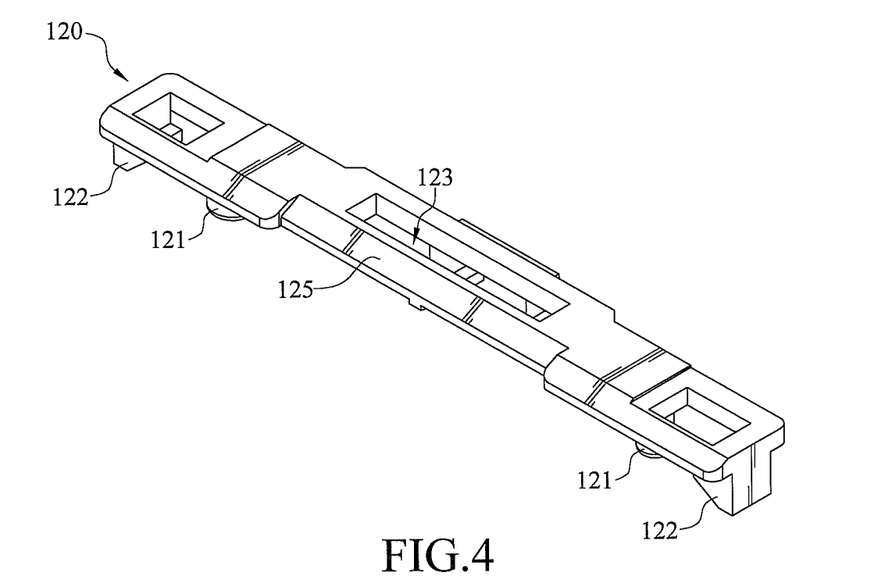
FIG. 4 is a schematic three-dimensional view of a fixing member according to the first embodiment of the present invention.

As shown in FIG. 3 and FIG. 4, the fixing members 120 are correspondingly disposed on the plurality of buckling portions 112 of the cover body 110. Each fixing member 120 has at least one positioning member and at least one restraining member. The positioning member may be, but not limited to, a column-shaped or rod-shaped positioning pin 121 disposed on the fixing member 120. Likewise, the restraining member may be, but not limited to, a restraining portion 122, which is capable of buckling, disposed on the fixing member 120. In this embodiment, the fixing member 120 has two positioning pins 121 and two restraining portions 122. But the numbers and the shapes of the positioning member and the restraining member may be changed and varied according to the actual requirements and are not limited to the numbers and shapes disclosed in this embodiment. The two positioning pins 121 are disposed at an interval on a side surface of the fixing member 120 facing the cover body 110, and the two positioning pins 121 are respectively corresponding to the two connecting holes 114 of the budding portion 112. The diameters of the two positioning pins 121 match those of the two connecting holes 114. That is, when the positioning pins 121 penetrates the two connecting holes 114, the surfaces of the two positioning pins 121 are forced against or engage the inner run of the connecting holes 114, and thus the positioning member and the connecting structure are joined together. In other words, the positioning pins 121 penetrates the two connecting holes 114 in manners of interference fit (or called friction fit). The lengths of the two positioning pins 121 are greater than the thicknesses of the two buckling pieces 113, so as to avoid detaching the fixing member 120 from the buckling portion 112. Short positioning pins 121 may be easily removed from the connecting holes 114 unintentionally.

The two restraining portions 122 are respectively disposed on two opposite ends of the fixing member 120 and located on the same surface where the two positioning pins 121 are disposed. The two restraining portions 122 are respectively corresponding to the two buckling pieces 113 of the buckling portion 112, and the two restraining portions 122 disposed on the fixing member 120 may be, but not limited to, hooks. In addition, the fixing member 120 has a through hole 123. The through hole 123 is arranged between two positioning pins 121 and extends from one side of the fixing member 120 to the opposite side thereof. Besides, the fixing member 120 has a hook 124 and a beveled surface 125 arranged between two positioning pins 121. The hook 124 and the beveled surface 125 are respectively disposed on the two opposite sides of the fixing member 120, where the hook 124 is deposed on a lateral side corresponding to the buckling portion 112 of the cover body 110. The beveled surface 125 slopes down from the through hole 123 to the other lateral side of the fixing member 120. As shown in FIG. 2 to FIG. 4, when each fixing member 120 is fixed to the corresponding buckling portion 112 of the cover body 110, the fixing member 120 penetrates the connecting holes 114 of the two budding pieces 113 respectively with the two positioning pins 121. And, the two restraining portions 122 of the fixing member 120 are respectively engaged with the two buckling pieces 113, so as to avoid detaching the fixing member 120 from the buckling portion 112 along the axis through the connecting hole 114. The hook 124 of the fixing member 120 are also engaged to the lateral edge where the buckling portion 112 connects to the base plate 111 in order to enhance the combination of the fixing member 120 and the cover body 110 in a radial direction of the connecting hole 114. So the fixing member 120 can be stably combined with the cover body 110. Moreover, in order to further enhance the structure strength of the fixing member 120, at least one reinforced rib 126 may be optionally disposed between two positioning pins 121 of the fixing member 120 over the through hole 123. The reinforced rib 126 can enhance the structure strength around the through hole 123 on the fixing member 120.

In addition, the diameters of the positioning pins 121, which are disposed on the fixing member 120, may be different from each other; and the diameters of the connecting holes 114 formed on the two buckling pieces 113 are respectively corresponding to the different diameters of the two positioning pins 121. For example, the diameter of one connecting hole 114 and one positioning pin 121 are greater than that of the other connecting hole 114 and positioning pin 121. In this way, each of the two positioning pins 121 can only match the connecting holes 114 having the corresponding diameters. So the fixing member 120 cannot be engaged to the buckling portion 112 in a wrong direction and thus a foolproof function for assembler is provided. As a result, it is convenient to assembler attaching the fixing member 120 on the cover body 110 and the operating efficiency can be improved.

As shown in FIG. 1 to FIG. 5, the second cover 20 has a plurality of buckling members 210 which are disposed along at least one side of the second cover 20. Besides, budding members 210 are disposed on the surface of the second cover 20 opposite to the first cover 10, and corresponding to the fixing members 120 on the first cover 10. Each of the buckling members 210 has a slant plane 211 which is corresponding to the beveled surface 125 of the fixing member 120. Therefore, when the second cover 20 is combined with the first cover 10, the slant planes 211 of the buckling members 210 is jointed to the beveled surfaces 125 of the fixing members 120. Then, the buckling members 210 slides into the through holes 123 along the beveled surfaces 125 and are budded with the fixing members 120. Thus, the second cover 20 is stably combined with the first cover 10 in a manner that the buckling members 210 are buckled on the fixing members 120.

Figure 5:
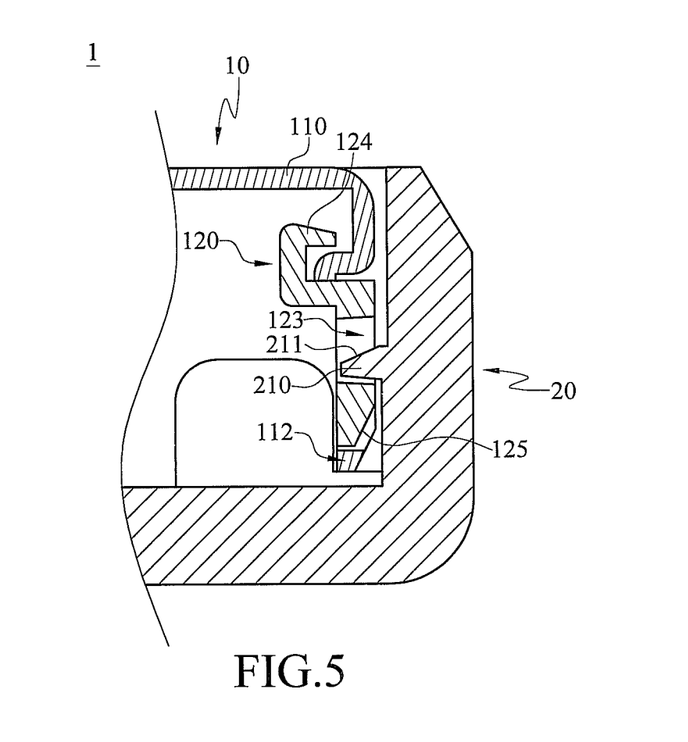
FIG. 5 is a schematic partial cross-sectional view of the first embodiment of the present invention.

The material of the fixing members 120 is similar in flexibility to or same as that of the second cover 20. In an embodiment of the present invention, the materials of the fixing members 120 and the second cover 20 are, but not limited to, plastic and the material of the cover body 110 of the first cover 10 is, but not limited to, metal. Therefore, during the course of buckling the buckling members 210 of the second cover 20 on the fixing members 120, the flexible fixing members 120 will be deformed when the slant planes 211 of the buckling members 210 are pushed against the beveled surfaces 125 of the fixing members 120. Thus, the flexible fixing members 120 can absorb the pushing force applied by the buckling members 210 and the risk of fracture is prevented. Besides, the fixing members are not integrated on the cover body, so the fixing members can be replaced even if the fixing members are fractured under the large force. Afterward when the buckling members 210 are buckled on the through holes 123 of the fixing members 120, the force applied on the fixing members 120 by the buckling members 210 will be released, and then the flexible fixing members 120 will recover to original shape. Also, the budding members 210 are stably limited in the through holes 123 of the fixing members 120. In this manner, when the first cover 10 is combined with the second cover 20 to form the display casing 1, the cover body 110 is prevented from sliding and detaching from the fixing members 120 by means of the positioning members and the restraining members. The fixing members 120 can restrict the movement of the cover body in a first direction (e.g. the radial direction of the connecting hole 114) or a second direction (e.g. the direction of the central axis of the connecting hole 114). That is to say, the positioning pins 121 of the fixing members 120 are used to fix the first cover 10 to prevent the first cover 10 from detaching from the second cover 20 in the horizontal direction, and the restraining portions 122 are used to fix the first cover 10 to prevent the first cover 10 from detaching from the second cover 20 in the vertical direction. Therefore the combination stability of the second cover 20 and the first cover 10 is improved and the second cover 20 cannot easily be detached from the first cover 10.

Figure 6:
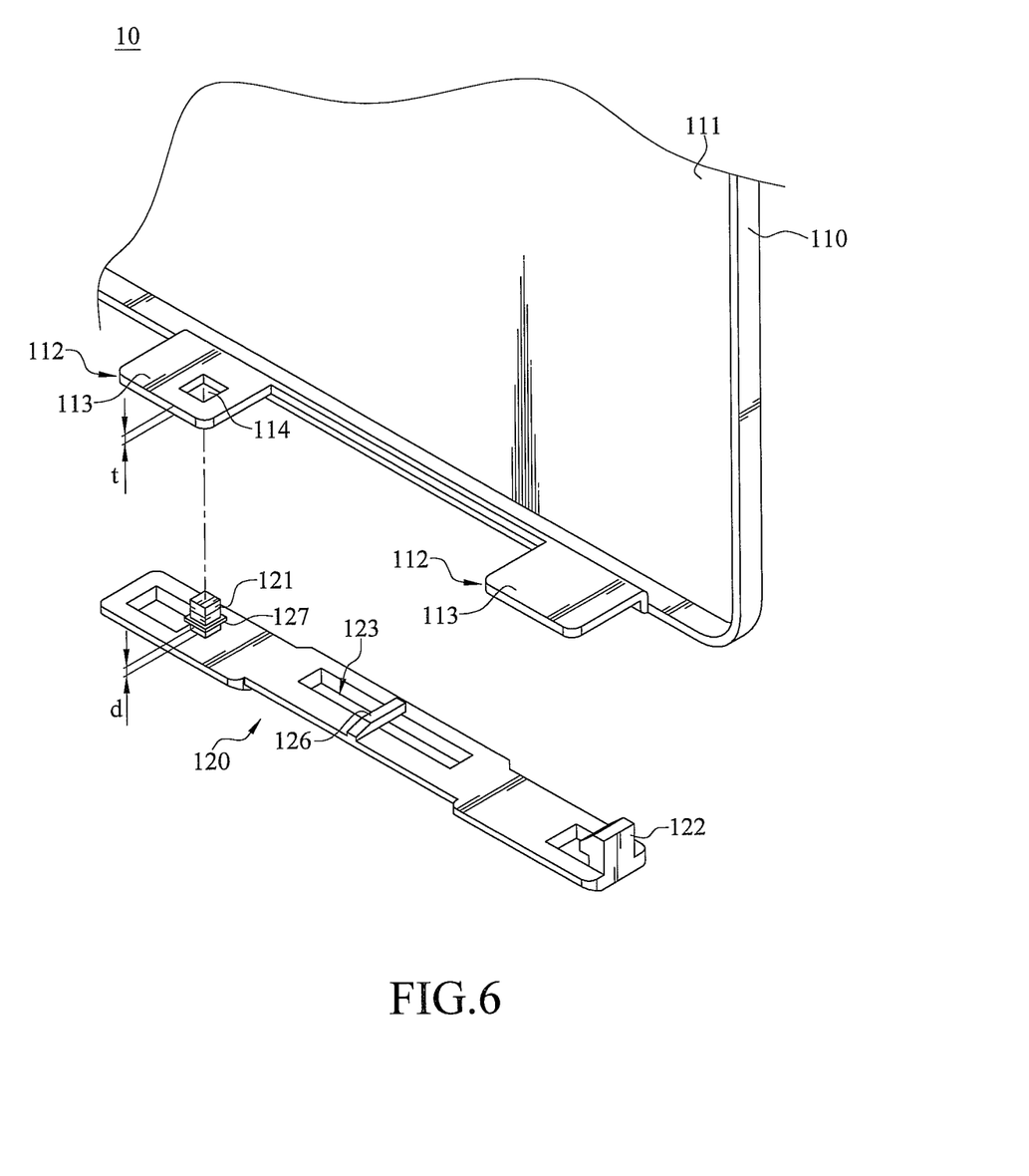
FIG. 6 is a schematic exploded view of a first cover according to a second embodiment of the present invention.

Although in an embodiment of the present invention, the fixing members 120 are engaged to two buckling pieces 113 of the cover body 110 with means of two positioning pins 121 and two restraining portions 122, the fixing member 120 may also be stably combined with the cover body 110 by a single positioning pin 121 and a single restraining portion 122 in another embodiment of the present invention. As shown in FIG. 6, in an embodiment of the present invention, a single positioning pin 121 and a single restraining portion 122 are disposed on the fixing member 120 and respectively corresponding to the two buckling pieces 113 of the buckling portion 112. The buckling piece corresponding to the positioning pin is provided with a connecting hole. Therefore, when the fixing members are engaged with the budding portions, the positioning pins can only penetrate through the connecting hole of the buckling pieces 113, thereby the foolproof function is provided.

In addition, in order to avoid the positioning pin 121 being detached from the buckling portion 112 along the central axis of the connecting hole 114, the positioning pin 121 is provided with a stopper member, so as to form a stopper portion 127 on the positioning pin 121. The stopper portion 127 may be disposed on the surface of the positioning pin 121 in the form of raised dots or ribs. The stopper portion 127 is suspended at an interval d over the surface of the fixing member 120, where the interval d matches the thickness t of the buckling piece 113. Therefore, after the positioning pin 121 of the fixing member 120 penetrates the connecting hole 114, the buckling piece 113 is retained in the interval d between the stopper portion 127 and the surface of the fixing member 120. Therefore the movement of the fixing member 120 along the central axis of the connecting hole 114 is confined, and so it is difficult to detach the fixing member 120 from the buckling portion 112.

Figure 7:
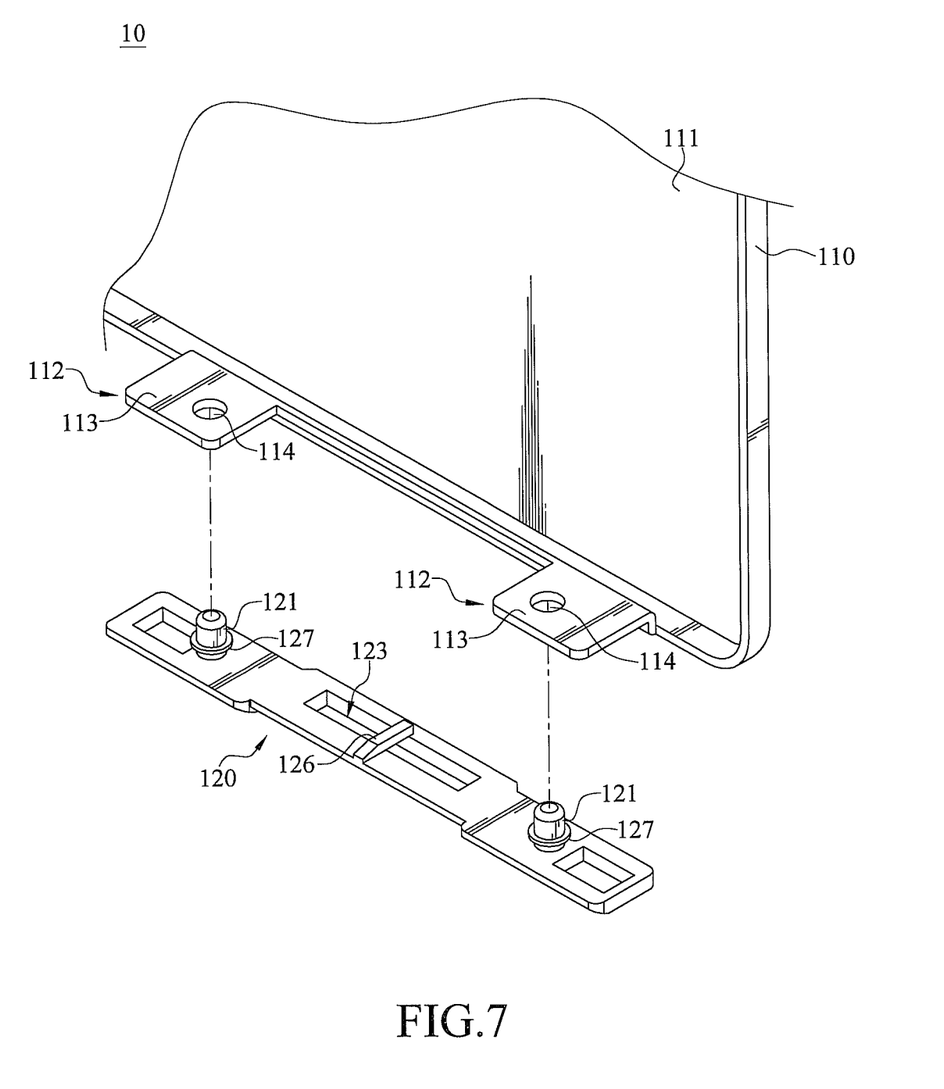
FIG. 7 and FIG. 8 are schematic exploded view of a first cover according to a third embodiment of the present invention.
Figure 8:
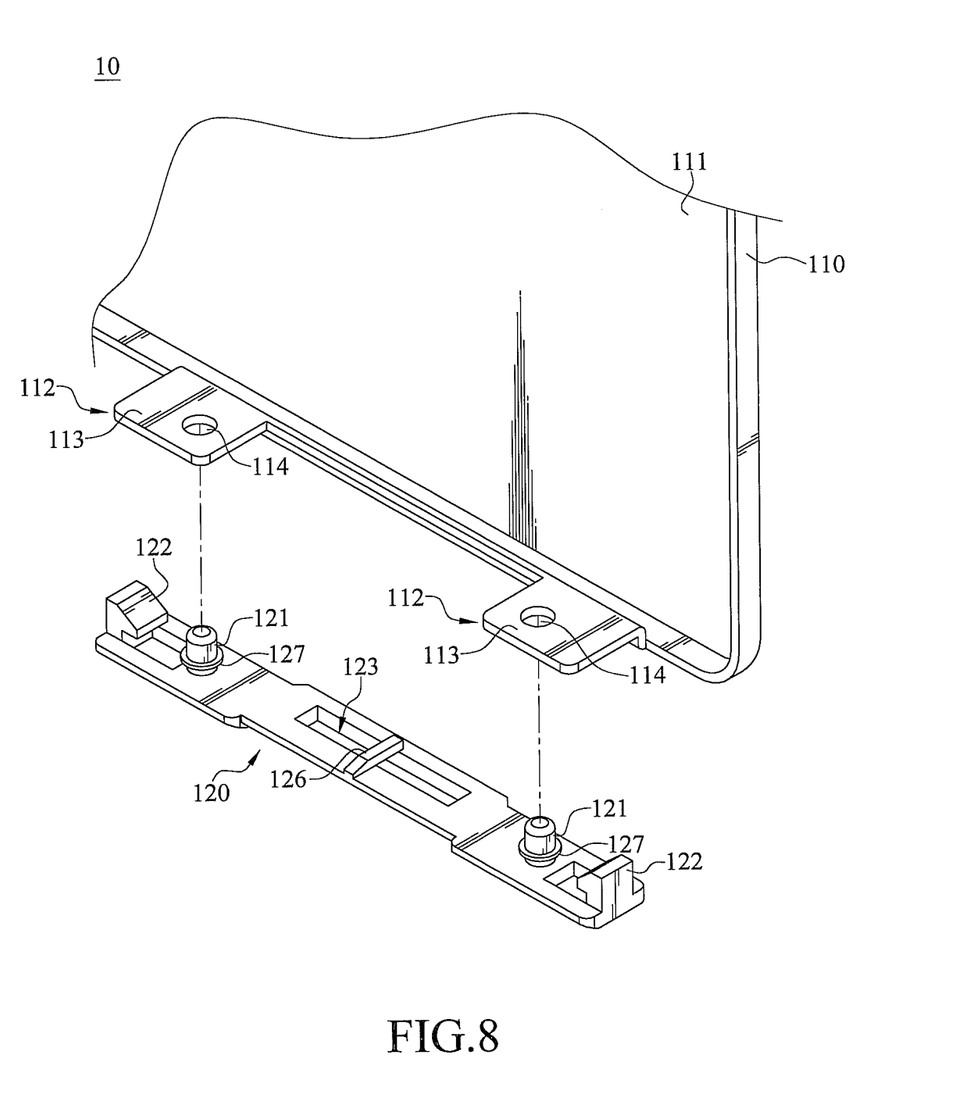

FIG. 7 shows a first cover structure according to an embodiment of the present invention. The structure is similar to the structures described in the above-mentioned embodiments, and the differences between them are disclosed as following. The fixing member 120 is provided with at least one positioning pin 121 of having a stopper portion 127, and there is no restraining portion or hooks on the fixing member 120. After the two positioning pins 121 on the fixing member 120 penetrates the two connecting holes 114, the stopper portion 127 retains the buckling piece 113 between the stopper portion 127 and the surface of the fixing member 120. Thus the fixing member 120 is stably engaged with the buckling portion 112. Otherwise, as shown in FIG. 8, in addition to a stopper portion 127 on the positioning pin 121, at least one restraining portion 122 may be disposed on the fixing member 120, so the fixing member 120 can be engaged with the two buckling pieces 113 by both the restraining portion 122 and the stopper portion 127. Thereby the fixing member 120 is more stably combined with the cover body 110.

The present invention discloses a structure of casing having the following effects. The fixing members disclosed in the present invention are made with flexible material similar to a second cover. Therefore, when the second cover is combined with the first cover, the second cover and the fixing members can be bended and absorb the force pushing the first cover to the second cover. Thus the facture on the fixing members or covers can be prevented during the assembly of the display casing. Besides, the fixing members have positioning pins and/or restraining portions corresponding to the buckling pieces and the connecting holes on the cover body of the first cover. So the fixing members can be quickly and stably assembled onto the first cover. As a result, time spent on the assembly of the display casing can be saved and the efficiency is improved.

What is claimed is:

1. A display casing, comprising:
    a first cover, comprising a cover body having at least one side and a plurality of buckling portions, wherein the plurality of buckling portions are disposed inwardly on the side of the cover body, each of the plurality of buckling portions has at least two buckling pieces, and at least one of the plurality of buckling pieces has a connecting structure;
    a plurality of fixing members corresponding to the plurality of buckling portions, each of the plurality of fixing members having at least one positioning member and a restraining member, wherein each positioning member is jointed to each connecting structure, and each restraining member is secured to one edge of each buckling piece; and
    a second cover, having a plurality of buckling members and being combined to the first cover, wherein the plurality of buckling members are correspondingly buckled on the plurality of fixing members,
    wherein the material of the cover body is different from that of the second cover, and wherein the first cover and the second cover together cover the plurality of fixing members such that the plurality of fixing members are not exposed to an outside of the first cover and the second cover, and
    wherein the at least one positioning member further comprises a stopper member disposed on the positioning member, and the stopper is separated at an interval from a surface of the plurality of fixing members, such that when the positioning member is joined with the connecting structure, the buckling piece is retained in the interval.

2. The display casing according to claim 1, wherein each of the plurality of fixing members has a through hole and the plurality of buckling members buckle the plurality of fixing members by the through holes.

3. The display casing according to claim 1, wherein each of the plurality of fixing members further comprises a hook disposed on each of a lateral side of the plurality of fixing members, and when the plurality of fixing members are combined with the plurality of buckling portions, the hooks hook each of a lateral edge of the plurality of buckling portions.

4. The display casing according to claim 1, wherein each of a lateral side of the plurality of fixing members has a beveled surface sloped from the cover body to a lateral side of the plurality of fixing members away from the cover body.

5. A device having a cover structure, comprising:
    a cover body having at least one side and a plurality of buckling portions, wherein the plurality of buckling portions are disposed inwardly on the side of the cover body, each of the plurality of buckling portions has at least one buckling piece, and at least one connecting structure is disposed on the at least one buckling piece of each buckling portion; and
    a plurality of fixing members corresponding to the plurality of buckling portions, each of the plurality of fixing members having at least one positioning member and a restraining member;
    wherein each positioning member is jointed to each connecting structure, and each restraining member is secured to an edge of each buckling pieces, and wherein the cover body covers the plurality of fixing members such that the plurality of fixing members are not exposed to an outside of the cover body, and
    wherein each positioning member further comprises a stopper member disposed on each positioning member, and the stopper member is separated at an interval from a surface of the plurality of fixing members, such that positioning member is joined with the connecting structure, the buckling piece is retained in the interval.

6. The cover structure according to claim 5, wherein the material of the plurality of fixing members is different from that of the cover body.

7. The cover structure according to claim 5, wherein the positioning member is configured to prevent the cover body from being detached from the plurality of fixing members in a first direction and the restraining member is configured to prevent the cover body from being detached from the plurality of fixing members in a second direction.

8. The cover structure according to claim 5, wherein each of the plurality of fixing members has a through hole arranged between the positioning member and the restraining member.

9. The cover structure according to claim 5, wherein each of the plurality of fixing members further comprise a hook disposed on each of a lateral side of the plurality of fixing members, and when the plurality of fixing members are combined with the plurality of buckling portions, the hooks hook each of a lateral edge of the plurality of buckling portions.

10. The cover structure according to claim 5, wherein a lateral side of the plurality of fixing members have a beveled surface sloped from the cover body to a lateral side of the plurality of fixing members away from the cover body.

11. A device having a cover structure, comprising:
    a cover body having at least one side and a plurality of buckling portions, wherein the plurality of buckling portions are disposed inwardly on the side of the cover body, each of the plurality of buckling portions has at least one buckling piece, and at least one connecting structure is disposed on the plurality of buckling pieces; and
    a plurality of fixing members corresponding to the plurality of buckling portions, each of the plurality of fixing members having at least one positioning member, and a stopper member is disposed on each of the at least one plurality of positioning members and suspended over a surface of the plurality of fixing members;
    wherein the plurality of positioning members of the plurality of fixing members are jointed to the connecting structure of the plurality of buckling portions, and the plurality of buckling pieces are retained by the plurality of stopper members and the surface of the plurality of fixing members, and wherein the cover body covers the plurality of fixing members such that the plurality of fixing members are not exposed to an outside of the cover body, wherein each of the plurality of stopper members protrudes outward from the each of the at least one plurality of positioning members, each of the plurality of stopper members is separated at an interval from each of a surface of the plurality of fixing members, such that when the positioning member is joined with the connecting structure, the buckling piece is retained in the interval.

12. The cover structure according to claim 11, wherein at least two connecting structures are deposed on the plurality of buckling pieces of the plurality of buckling portions, and one of the connecting structures is bigger than another of the connecting structures.

13. The cover structure according to claim 11, wherein the material of the plurality of fixing members is different from that of the cover body.

14. The cover structure according to claim 11, wherein each of the plurality of fixing members has a through hole.

15. The cover structure according to claim 11, wherein each of the plurality of fixing members further comprises a hook disposed on each of a lateral side of the plurality of fixing members, and when the plurality of fixing members are combined with the plurality of buckling portions, the hooks hook each of a lateral edge of the plurality of buckling portions.

16. The cover structure according to claim 11, wherein each of a lateral side of the plurality of fixing members has a beveled surface sloped from the cover body to each of a lateral side of the plurality of fixing members away from the cover body.

* * * * *